Patented July 13, 1943

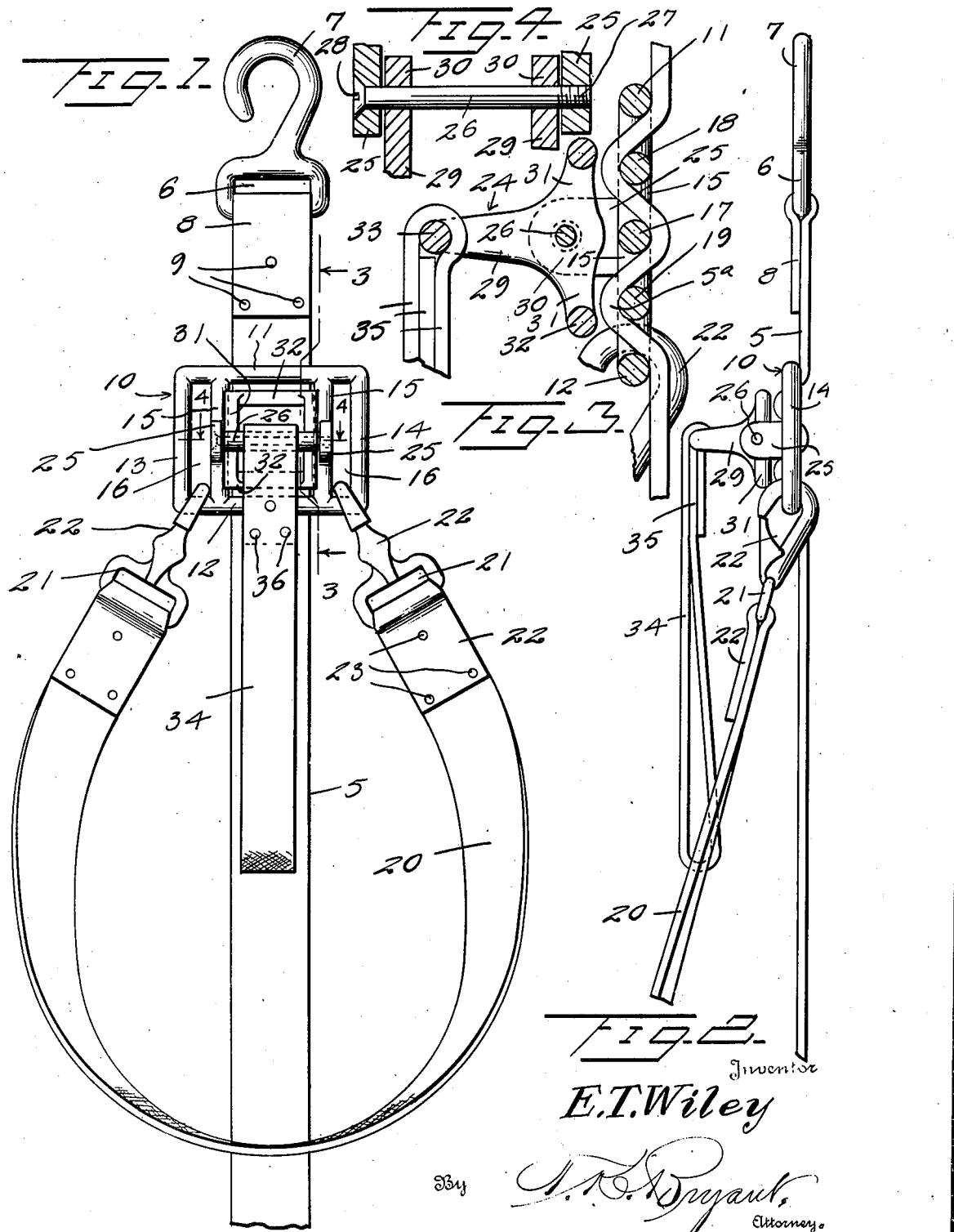

2,323,883

UNITED STATES PATENT OFFICE 2,323,883

PORTABLE FIRE ESCAPE

Edward T. Wiley, Auburn, N. Y.

Application February 17, 1943, Serial No. 476,232

3 Claims. (Cl. 227—35)

This invention relates to certain new and useful improvements in portable fire escapes.

The primary object of the invention is to provide a portable fire escape of the reversible type and in the form of a tape or webbing of any predetermined length having a hook member or the like at each end thereof for selective engagement with a holding or anchor element with a brake frame structure slidable on the webbing and having attached thereto a body harness or strap and a a brake lever reversibly operated, whereby either end of the webbing may be anchored and the speed of descent of a person carried in the harness regulated by operation of the brake lever.

A further object of the invention is to provide a portable fire escape of the foregoing character that is of comparatively simple construction, inexpensive to manufacture, and which when folded or rolled occupies a minimum of space and is well adaptable for use in hotels, public buildings, schools, industrial plants, private homes, city fire departments, and wherever it is desired that a person be lowered from a burning building or other structure, such as entering life boats or rafts of burning ships.

With the above and other objects in view that will become apparent as the nature of the invention is better understood, the same consists in the novel form, combination and arrangement of parts hereinafter more fully described, shown in the accompanying drawing, and claimed.

In the accompanying drawing:

Figure 1 is a fragmentary elevational view of a portable fire escape constructed in accordance with the present invention, the length of webbing being broken away, Figure 2 is a side elevational view of the device with the webbing broken away, Figure 3 is an enlarged detail sectional view taken on line 3—3 of Figure 1, showing the length of webbing sinuously trained through the brake frame and showing the reversible brake lever disengaged from the webbing, and Figure 4 is a detail sectional view taken on line 4—4 of Figure 1, showing the pivotal mounting of the brake lever on the brake frame.

Referring more in detail to the accompanying drawing, there is illustrated a portable fire escape embodying an indefinite length of tape or webbing 5 formed of any preferred material, such as multi-ply cotton, leather or the like, only one end of this webbing 5 being illustrated but both ends are similarly constructed, and as shown in Figures 1 and 2, the end of the webbing 5 is looped through the eye portion 6 of a hook 7 and folded upon itself as at 8 to be secured to the run of the webbing by rivets 9 or any other fastening devices such as stitching or the like.

The webbing 5 is sinuously threaded through a rectangular brake frame designated in general by the reference character 10 that comprises a plurality of bars, preferably cylindrical in cross-section, the side bars of the rectangular frame being designated respectively by the reference characters 11 and 12 that are connected by end bars 13 and 14. A pair of intermediate bars 15 parallel with and respectively adjacent the end bars 13 and 14 extend between the side bars 11 and 12 providing a slot 16 adjacent each end of the brake frame for purposes presently to appear.

As shown more clearly in Figures 1 and 3, the intermediate bars 15 are connected by a center cross bar 17 while a brake bar 18 extends between the intermediate bars 15 in parallel relation to the center bar 17 and side bar 11 and equidistantly spaced from said bars. A second brake bar 19 similarly extends between the intermediate bars 15 and is parallel with the center bar 17 and side bar 12, being equidistantly spaced between said bars. As shown in Figure 3 the webbing 5 is sinuously threaded through the bars 11, 18, 17, 19 and 12.

The body harness for the support of a person using the portable fire escape comprises a strap or webbing 20 of material similar to the webbing 5 and each end of this body strap is passed through the eye portion 21 of a snap hook designated 22, with the return-bent portion 22 of the body strap ends secured to the run of the body strap as by rivets 23 or any other preferred fastening means. The snap hooks 22 are engaged with the brake frame 10 in the end slot portions 16 thereof.

To control the speed of descent of a person using the portable fire escape, a brake device designated in general by the reference character 24 is associated with the brake frame and this brake device and its supporting elements comprise a pair of ears 25 projecting from the same side of the intermediate bars 15 of the brake frame for the mounting of a pivot bolt or pin 26, one end of which is threaded as at 27 for threaded engagement with one of the ears 25, while its other end 28 is provided with a kerf and countersunk similar to a screw head to lie flush with the outer face of the other mounting ears 25. The brake lever per se is in the form of a lever frame having a pair of side arms 29 pivotally supported at corresponding ends 30 on the pivot pin 26, each pivoted end 30 of a side arm carrying an outwardly directed extension foot 31 at each side of the pivot with corresponding ends of the extension feet 31 connected by a brake rod 32 positioned respectively in proximity of the brake rods 18 and 19 of the brake frame 10. The other ends of the side arms 29 of the frame lever are connected by a cross rod 33 for the attachment of a hand strap 34 for the manual reversible operation of the brake lever 24. The hand strap 34 is of the loop type with the overlapped ends 35 thereof engaged with the band 33 suitably secured together as by rivets 36 or the like.

The portable fire escape disclosed herein occupies a minimum of space when folded or rolled and when extended for use with the brake frame 10 normally disposed adjacent one end of the webbing 5, the adjacent end hook 7 may be engaged with the leg of a radiator or any article of furniture with the length of the webbing 5 passed out of a window or other building opening. The body strap 20 is passed around the body of a person using the fire escape below the shoulder, with the snap hooks engaged in the slot areas 16 in the brake frame. By manipulation of the brake lever 24 when viewing Figure 3 of the drawing, a downward pull on the hand strap 34 will cause the lower brake rod 32 to move toward and engage the serpentine portion 5ª of the webbing and cause it to bind on the brake rod 19, the amount of pressure exerted on the hand strap 34 determining the speed of travel of the brake frame 10 over the webbing 5 and the descent of the person using the fire escape. When the person using the escape has reached the ground or other safety level and moves out of the body strap 20, another person in the room at the anchored end of the webbing retrieves all of the webbing and anchors the opposite end thereof for instant use of the fire escape. When reversed, the other brake rod 32 of the brake lever 24 co-operates with the adjacent serpentine portion of the webbing and the brake rod 18 of the brake frame.

From the above detailed description of the invention it is believed that the construction and operation thereof will at once be apparent, and while there is herein shown and described the preferred embodiment of the invention, it is nevertheless to be understood that minor changes may be made therein without departing from the spirit and scope of the invention as claimed.

I claim:

1. In a reversible portable fire escape of the character described, a webbing having an anchor hook at each end thereof, a rectangular brake frame having side and end bars, an intermediate bar parallel with each end bar adjacent the latter, a center bar between the intermediate bars, a brake bar at each side of the center bar, a brake lever comprising a pair of side arms, a cross bar at corresponding ends thereof for attachment of a hand strap, an ear extending outwardly of each intermediate bar, a pivot pin extending between the ears upon which the other ends of the side arms are pivotally mounted, opposite extensions on the side arms at the pivoted ends thereof, a brake bar extending between corresponding ends of the opposite extensions for co-operation with the brake bars of the brake frame and a body harness including a strap having a fastener element at each end engageable with the brake frame between the end and adjacent intermediate bars.

2. In a reversible portable fire escape of the character described, a webbing having an anchor hook at each end thereof, a brake frame having a plurality of cross bars through which the webbing sinuously extends, a hand-operated brake lever pivoted in the brake frame and having brake bars selectively binding portions of the webbing on cross brake bars of the brake frame, a body harness attached to the brake frame, the pivotal connection between the brake lever and brake frame including a pair of ears projecting outwardly of the brake frame, and a pivot pin extending between said ears with the brake lever pivoted on said pin.

3. In a reversible portable fire escape of the character described, a webbing having an anchor hook at each end thereof, a brake frame having a plurality of cross bars through which the webbing sinuously extends, a hand-operated brake lever pivoted in the brake frame and having brake bars selectively binding portions of the webbing on cross brake bars of the brake frame, a body harness attached to the brake frame, the pivotal connection between the brake lever and brake frame including a pair of ears projecting outwardly of the brake frame, and a pivot pin extending between said ears, the brake lever comprising a pair of side arms pivoted on said pin with a brake bar thereof disposed at each side of the pivot pin.

EDWARD T. WILEY.